(No Model.) 2 Sheets—Sheet 1.

A. M. BINGHAM.
COMBINED CHURN AND BUTTER WORKER.

No. 544,719. Patented Aug. 20, 1895.

Witnesses
Thos. F. Gatchel.
L. G. Randall

Inventor
Abial M. Bingham
by John Wedderburn
his Attorney

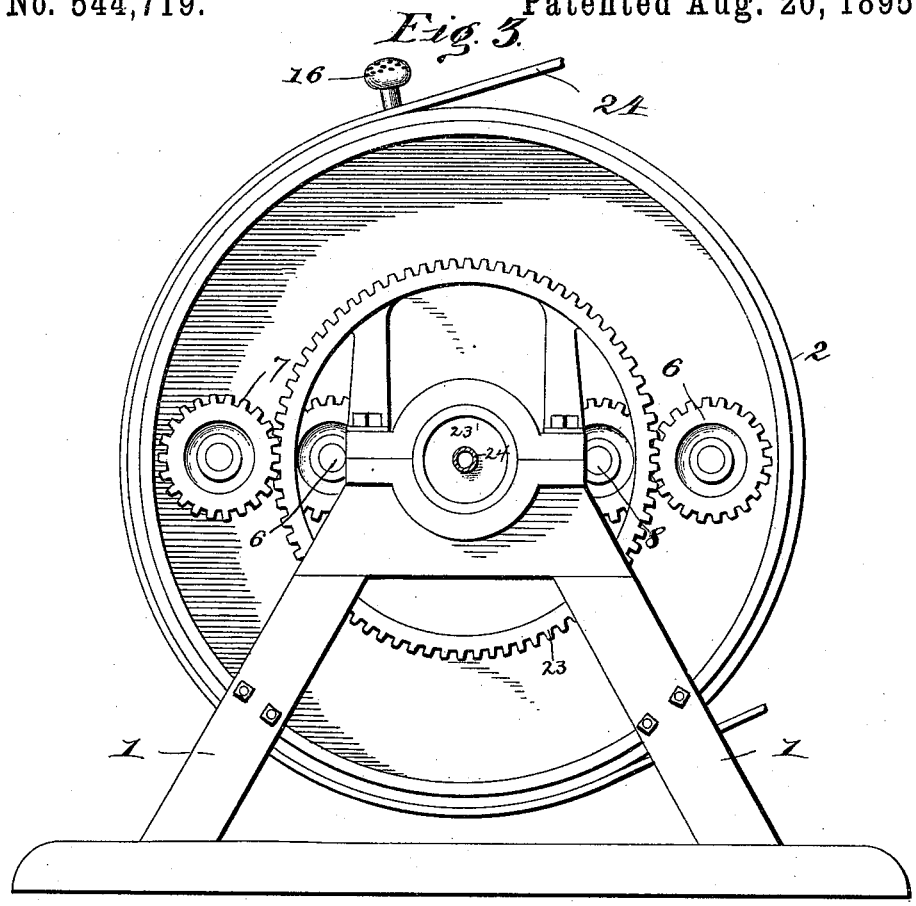
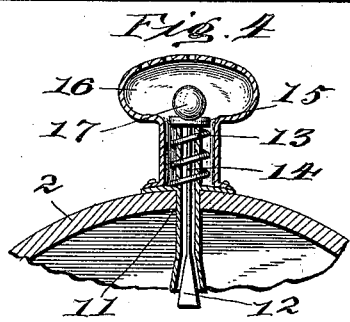
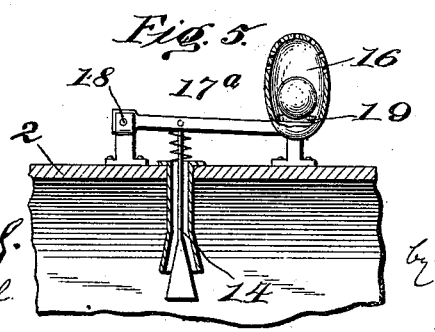

UNITED STATES PATENT OFFICE.

ABIAL MILLS BINGHAM, OF JESUP, IOWA.

COMBINED CHURN AND BUTTER-WORKER.

SPECIFICATION forming part of Letters Patent No. 544,719, dated August 20, 1895.

Application filed December 11, 1894. Serial No. 531,480. (No model.)

*To all whom it may concern:*

Be it known that I, ABIAL MILLS BINGHAM, a citizen of the United States, residing at Jesup, in the county of Buchanan and State of Iowa, have invented certain new and useful Improvements in a Combined Churn and Butter-Worker; and I do hereby declare the following to be a full, clear, and exact description of the invention, such as will enable others skilled in the art to which it appertains to make and use the same.

In the United States Patent No. 525,580, granted to me September 4, 1894, I have shown and described an apparatus for tempering cream, churning and working butter in a simple organized structure, the churn proper being provided with partitions dividing the same into two compartments, a rotating butter-worker and a removable partition against which the butter lodges, and spring-actuated valves for releasing the confined gases in said churn. In actual practice, the invention is found to work quite well, but I have discovered that by certain improvements it can be worked much more advantageously. These improvements form the subject-matter of my present application, and consist of dispensing with the permanent partition in the churn and substituting therefor a partition made by rotating paddles. I further do away with the rotation of the workers in opposite directions at each one-half revolution of churn, as provided in my patent, and instead use a continuous rotation of the workers. Furthermore, I provide an improved valve for automatically releasing the confined gases generated, the same consisting of a valve-rod extending up into a socket in which is placed a ball which, once in every revolution, is adapted to rest upon an enlarged end of the valve-rod, depress said rod, and thereby operate the valve.

The invention is clearly illustrated in the accompanying drawings, in which—

Figure 1:
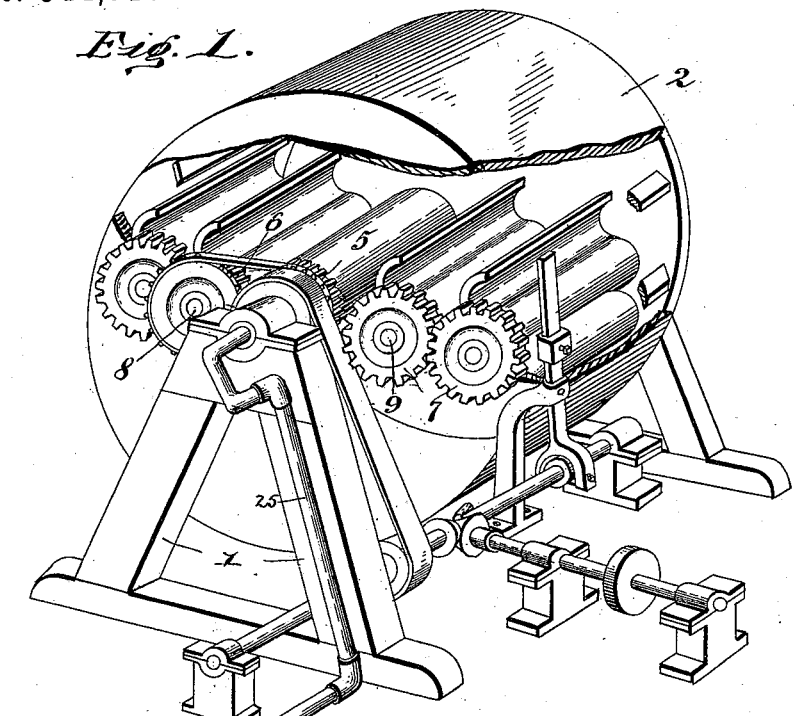
Figure 2:
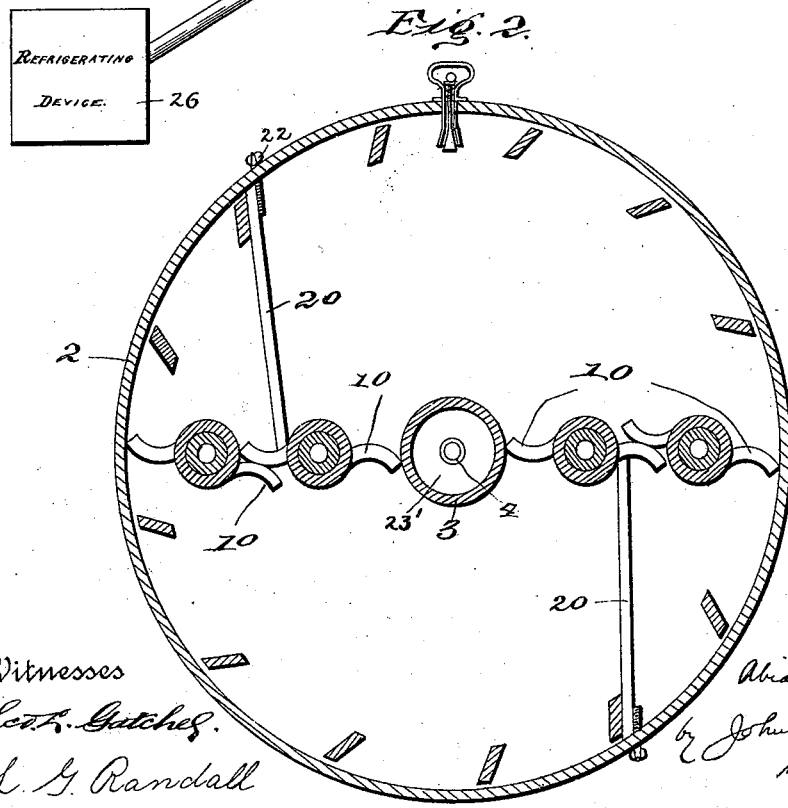

Figure 1 represents a perspective view of my churn, partly broken away to show the interior construction thereof. Fig. 2 is a cross-section of the same. Fig. 3 is an end view of a modified form. Fig. 4 is a detail view, on an enlarged scale, of my automatic valve; and Fig. 5 is a similar view of a modification thereof.

Like numerals of reference indicate like parts in the various views.

1 represents an upright or standard, in the upper end of which is mounted in suitable bearings the hollow shaft of the churn 2. The said cylinder or churn 2 has running longitudinally through the center thereof a tempering-chamber 3, substantially like that described in my patent before mentioned. Upon the hollow shaft 4 on which the churn 2 is mounted is a slip-pinion 5, meshing with similar pinions 6 and 7 upon the shafts 8 and 9 of my rotating paddles 10. These paddles extend longitudinally through the machine and, as shown in Fig. 2, form a partition dividing the churn 2 into separate compartments. The pinions on the shaft upon which these rotatable paddles are mounted are adapted to be thrown into and out of gear with the pinion 5, and they are kept out of gear during the churning process.

In Fig. 3 I have shown a circular rack 23, secured to the side of the upright 1, with which the pinions 6 and 7 are adapted to engage upon the rotation of the churn 2 by means of the belt 24 passing around the same. In this instance the pinions 6 and 7 are slip-pinions, and are adapted to be thrown into and out of engagement with said rack 23.

11 represents a vent-hole in the sides of the churn 2, in which moves a vertical valve 12, held normally closed by means of a coiled spring 13 thereon. The valve-rod 14 is connected with this spring, and has at its upper end, in the form shown in Fig. 4, the cup 15. Surrounding the outside of the valve-rod and spring is a hollow chamber or pocket 16, in which moves a metallic ball 17. In the form shown in Fig. 5 the valve-rod 14 has pivoted to it a lever 17ª, fulcrumed at 18 in the side of the churn and having its outer end formed with a cup 19, similar to the cup 15 shown in Fig. 4, the end of the said lever being surrounded by the chamber 16.

As the churn rotates on its axis the ball 17 moves freely in the chamber 16, and when the churn is in an upright position the ball 17 rests in the cup of the valve-rod or of the lever connected with the valve-rod and depresses the same, opening the valve 11 and permitting the escape of confined gases in the churn. As the churn continues to rotate the ball is thrown from its seat in the cup 15 and the valve is closed by means of the spring 13, before mentioned. The removable partitions 20 are located in the angles formed between the partitions made by the paddles 10 and the churn-body. These partitions are supported at their inner ends in the curved portion of the paddles 10, and are held in place at their outer ends by binding-screws 22, which pass through the body of the churn. They serve the same function and correspond in all respects with the removable partitions I of my former patent referred to—that is, of confining the granules of butter and of freeing the same of buttermilk by centrifugal force as the churn is rotated.

The movable partition 20 may be fixed across the churn in sections near the inner circumference of the churn-body. Only when the workers are run with the reversing motion, however, is it essential that these movable partitions be made in sections and fixed near the inner circumference of the churn when not engaged with the paddles in extracting the milk and mixing the salt into the granulated butter. The ends of the hollow shaft 4 are covered by plates 23, provided with a threaded extension 24, upon one end of which a pipe 25, leading from a suitable cooling source 26, is adapted to fit for the purpose of cooling the interior of the churning-chamber.

The operation of the device is as follows: The cream is inserted in the churn 2 through suitable doors, and the same is caused to rotate by means of power applied to the hollow shaft 4, upon which the churn is mounted, the same being a continuous rotary movement. During this movement the paddles 10 are in alignment, thereby dividing the churn into two compartments. This rotary movement of the churn is continued until the cream has been converted into butter, after which the removable partitions 20 are removed and the buttermilk is extracted by centrifugal force and the salt mixed with the granulated butter. Upon removing the partitions the pinions on the ends of the paddle-shaft are thrown into engagement with the pinion on the shaft of the churn or with the circular rack secured to the upright standards, and the said paddles are caused to rotate, thereby working the butter. During this process of working the butter, the same is salted evenly, and when it is removed from the churn it is completely packed and flavored and ready for use. At each revolution of the churn the gases contained therein are given vent by means of the automatically-operated valve heretofore described.

What is claimed as the invention, and is desired to be secured by Letters Patent, is—

1. The combination with a churn, of butter-working paddles located therein and extending from side to side thereof and adapted to form a partition dividing the said churn in separate compartments, and means to lock them in such position, substantially as described.

2. The combination with the supports or uprights having a circular rack secured thereto, of a churn mounted in bearings on said uprights, a pinion on the main shaft of said churn, rotating paddles located in said churn having pinions on the shafts upon which they rotate, the said pinions being adapted to be thrown into and out of gear with the said circular rack, whereby the said paddles are adapted to form partitions dividing the said churn into two compartments and to work the butter after the churning process has been completed, substantially as and for the purposes specified.

3. The combination with a churn adapted to rotate, of a valve therein consisting of a valve-rod, a spring for normally holding the same in its closed position, said valve rod having a cup on its outer end, an inclosing pocket for the outside of said valve rod and a ball loosely mounted in said socket whereby, upon the rotation of said churn, the ball is adapted to engage the cup on the upper edge of said rod and release the valve, substantially as and for the purposes described.

In testimony whereof I have signed this specification in the presence of two subscribing witnesses.

ABIAL MILLS BINGHAM.

Witnesses:
J. M. GROAT,
J. F. KLINGAMAN.